United States Patent
Kodama et al.

(10) Patent No.: US 8,827,850 B2
(45) Date of Patent: Sep. 9, 2014

(54) CONTROL DEVICE AND CONTROL METHOD FOR CONTINUOUSLY VARIABLE TRANSMISSION

(75) Inventors: Yoshihisa Kodama, Sagamihara (JP); Kazuya Okamoto, Fuji (JP); Hiroki Iwasa, Fuji (JP); Hiroyasu Tanaka, Atsugi (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 284 days.

(21) Appl. No.: 12/470,617

(22) Filed: May 22, 2009

(65) Prior Publication Data

US 2009/0298625 A1 Dec. 3, 2009

(30) Foreign Application Priority Data

May 30, 2008 (JP) ................................. 2008-142735

(51) Int. Cl.
*F16H 59/00* (2006.01)
*F16H 61/662* (2006.01)
*F16H 61/66* (2006.01)

(52) U.S. Cl.
CPC .... *F16H 61/66259* (2013.01); *F16H 61/66272* (2013.01); *F16H 2061/6605* (2013.01)
USPC .................. 474/18; 474/11; 474/28

(58) Field of Classification Search
USPC .................. 474/11, 8–10, 12–28; 123/196 R
See application file for complete search history.

(56) References Cited

U.S. PATENT DOCUMENTS

| 4,823,267 | A | 4/1989 | Kumura | |
|---|---|---|---|---|
| 5,871,411 | A * | 2/1999 | Senger et al. | 474/11 |
| 6,459,978 | B2 * | 10/2002 | Taniguchi et al. | 701/51 |
| 6,666,793 | B2 * | 12/2003 | Narita et al. | 477/40 |
| 6,672,981 | B2 * | 1/2004 | Inoue et al. | 474/28 |
| 6,733,417 | B2 * | 5/2004 | Ajimoto | 477/45 |
| 7,211,013 | B2 * | 5/2007 | Watanabe et al. | 474/18 |
| 7,806,791 | B2 * | 10/2010 | Izumi et al. | 474/28 |
| 2004/0127313 | A1 * | 7/2004 | Shimanaka et al. | 474/18 |
| 2006/0068953 | A1 | 3/2006 | Tsukada et al. | |
| 2008/0119308 | A1 * | 5/2008 | Iwasa et al. | 474/70 |
| 2008/0139350 | A1 * | 6/2008 | Iwasa et al. | 474/18 |

FOREIGN PATENT DOCUMENTS

| EP | 0 373 865 | A2 | 6/1990 |
|---|---|---|---|
| EP | 1 403 565 | A2 | 3/2004 |
| EP | 1 925 858 | A2 | 5/2008 |
| JP | 3-292452 | A | 12/1991 |
| JP | 09-329229 | A | 12/1997 |
| JP | 2006-348974 | A | 12/2006 |

* cited by examiner

*Primary Examiner* — Michael Mansen
*Assistant Examiner* — Minh Truong
(74) *Attorney, Agent, or Firm* — Foley & Lardner LLP (57) ABSTRACT

When the vehicle is stationary, the gear ratio is shifted to a Low side by controlling the position of a shift actuator such that a shift control valve is controlled to a position in which a first oil pressure shifts toward a neutral position side by a predetermined amount from a maximum discharge side position and a controlling secondary pulley pressure control unit to increase a second oil pressure to a predetermined oil pressure.

6 Claims, 6 Drawing Sheets

CONTROL DEVICE AND CONTROL METHOD FOR CONTINUOUSLY VARIABLE TRANSMISSION

TECHNICAL FIELD OF THE INVENTION

This invention relates to a belt type continuously variable transmission, and more particularly to a control device for a belt type continuously variable transmission which, when a vehicle is stationary, returns a gear ratio to Low.

BACKGROUND OF THE INVENTION

A belt type continuously variable transmission transmits power using a belt wound between a drive pulley (primary pulley) and a driven pulley (secondary pulley).

When rapid deceleration occurs in a vehicle installed with a belt type continuously variable transmission such as that described above, a downshift is performed rapidly in accordance with the deceleration to secure a post-deceleration and post-stoppage restarting ability.

At this time, a gear ratio variation speed must be controlled to prevent belt slippage, but the gear ratio may not always be shifted to an appropriate gear ratio (a Lowest position, for example) as a result of this control during the rapid deceleration. When the vehicle comes to a halt in this situation, the vehicle cannot restart easily. In particular, when rapid deceleration occurs while traveling on an uphill road, the vehicle is more likely to come to a halt due to hill-climbing resistance, and therefore the vehicle stops before the downshift has been performed sufficiently. In this case, restarting is likely to be difficult.

To secure a restarting ability when a vehicle stops without having performed a downshift sufficiently, JP3-292452A discloses a gear ratio control device for a continuously variable transmission installed in a vehicle which, when a vehicle speed does not increase even though a throttle valve opening is large, performs a downshift by increasing the oil pressure of a secondary side (driven side) pulley and reducing the oil pressure of a primary side (drive side) pulley while a clutch is engaged, thereby causing a belt to slide longitudinally with the pulleys in a non-rotational state.

SUMMARY OF THE INVENTION

However, with the invention disclosed in JP3-292452A, the oil pressure of the drive side pulley is reduced when the vehicle starts, or in other words in a transitional state when the drive side pulley is rotational and the engine torque is likely to vary (increase) rapidly.

Hence, in the transitional state, a gripping force of the belt is insufficient, and therefore belt slippage may occur. As a result of this belt slippage, the belt may become stuck to the pulleys due to frictional heat, causing damage to the belt and pulleys, and therefore belt slippage must be forestalled.

This invention has been designed in consideration of the problem described above, and it is an object thereof to provide a control device for a belt type continuously variable transmission which is capable of preventing damage to a belt and a pulley caused by variation in an engine torque even when a downshift is performed while a vehicle is stationary.

According to an aspect of the invention, a control device for a belt type continuously variable transmission including an input-side primary pulley, a groove width of which is varied in accordance with a first oil pressure, an output-side secondary pulley, a groove width of which is varied in accordance with a second oil pressure, and a belt wound around the primary pulley and the secondary pulley such that a contact radius thereof with the pulleys varies in accordance with the groove width, which controls the continuously variable transmission such that a torque transmitted from an output-side of an engine of a vehicle is transmitted from the primary pulley to the secondary pulley via the belt and a gear ratio determined in relation to the contact radius varies continuously is provided The control device comprises a vehicle speed detecting unit that detects a vehicle speed; a shift actuator; a shift control valve that controls the first oil pressure by being switched between a position in which the first oil pressure is supplied to the primary pulley, a position in which the first oil pressure is discharged, and a neutral position in accordance with a physical positional relationship between a position of a movable flange of the primary pulley and a position of the shift actuator; a secondary pulley pressure control unit that controls the second oil pressure; and a stationary Low return control unit that varies the gear ratio to a Low side when the vehicle is stationary by controlling the shift control valve in accordance with the position of the shift actuator such that the first oil pressure is discharged and controlling the secondary pulley pressure control unit to increase the second oil pressure to a predetermined oil pressure, whereby the contact radius between the belt and the primary pulley is displaced in a decreasing direction and the contact radius between the belt and the secondary pulley is displaced in an increasing direction while the primary pulley and the secondary pulley are non-rotational, wherein the stationary Low return control unit control the position of the shift actuator such that the shift control valve is controlled to a position in which the first oil pressure shifts toward the neutral position side by a predetermined amount from a maximum discharge side position.

According to another aspect of the invention, a control method for a belt type continuously variable transmission comprising an input-side primary pulley, a groove width of which is varied in accordance with a first oil pressure, an output-side secondary pulley, a groove width of which is varied in accordance with a second oil pressure, and a belt wound around the primary pulley, the secondary pulley such that a contact radius thereof with the pulleys varies in accordance with the groove width, which controls the continuously variable transmission such that a torque transmitted from an output-side of an engine of a vehicle is transmitted from the primary pulley to the secondary pulley via the belt and a gear ratio determined in relation to the contact radius varies continuously, a shift actuator and a shift control valve which controls the first oil pressure by being switched between a position in which the first oil pressure is supplied to the primary pulley, a position in which the first oil pressure is discharged, and a neutral position in accordance with a physical positional relationship between a position of a movable flange of the primary pulley and a position of the shift actuator is provided The control method comprises a vehicle speed detecting step for detecting a vehicle speed; a secondary pulley pressure control step for the second oil pressure; and a stationary Low return control step for varying the gear ratio to a Low side when the vehicle is stationary by controlling the shift control valve in accordance with the position of the shift actuator such that the first oil pressure is discharged and executing the secondary pulley pressure control step to increase the second oil pressure to a predetermined oil pressure, whereby the contact radius between the belt and the primary pulley is displaced in a decreasing direction and the contact radius between the belt and the secondary pulley is displaced in an increasing direction while the primary pulley and the secondary pulley are non-rotational, wherein the stationary Low return control step controls the position of the shift actuator such that the shift control valve is controlled to a position in which the first oil pressure shifts toward the neutral position side by a predetermined amount from a maximum discharge side position.

According to these aspects, the oil pressure of the shift control valve is controlled to a position located toward the neutral position side by a predetermined amount from the maximum discharge side position, and therefore a reduction in a belt gripping force can be prevented without causing the first oil pressure of the primary pulley to decrease more than necessary. As a result, belt slippage caused by variation in the engine torque when the vehicle is stationary can be prevented.

The details as well as other features and advantages of this invention are set forth in the remainder of the specification and are shown in the accompanying drawings.

DESCRIPTION OF THE PREFERRED EMBODIMENTS

An embodiment of this invention will be described below on the basis of the drawings.

Figure 1:
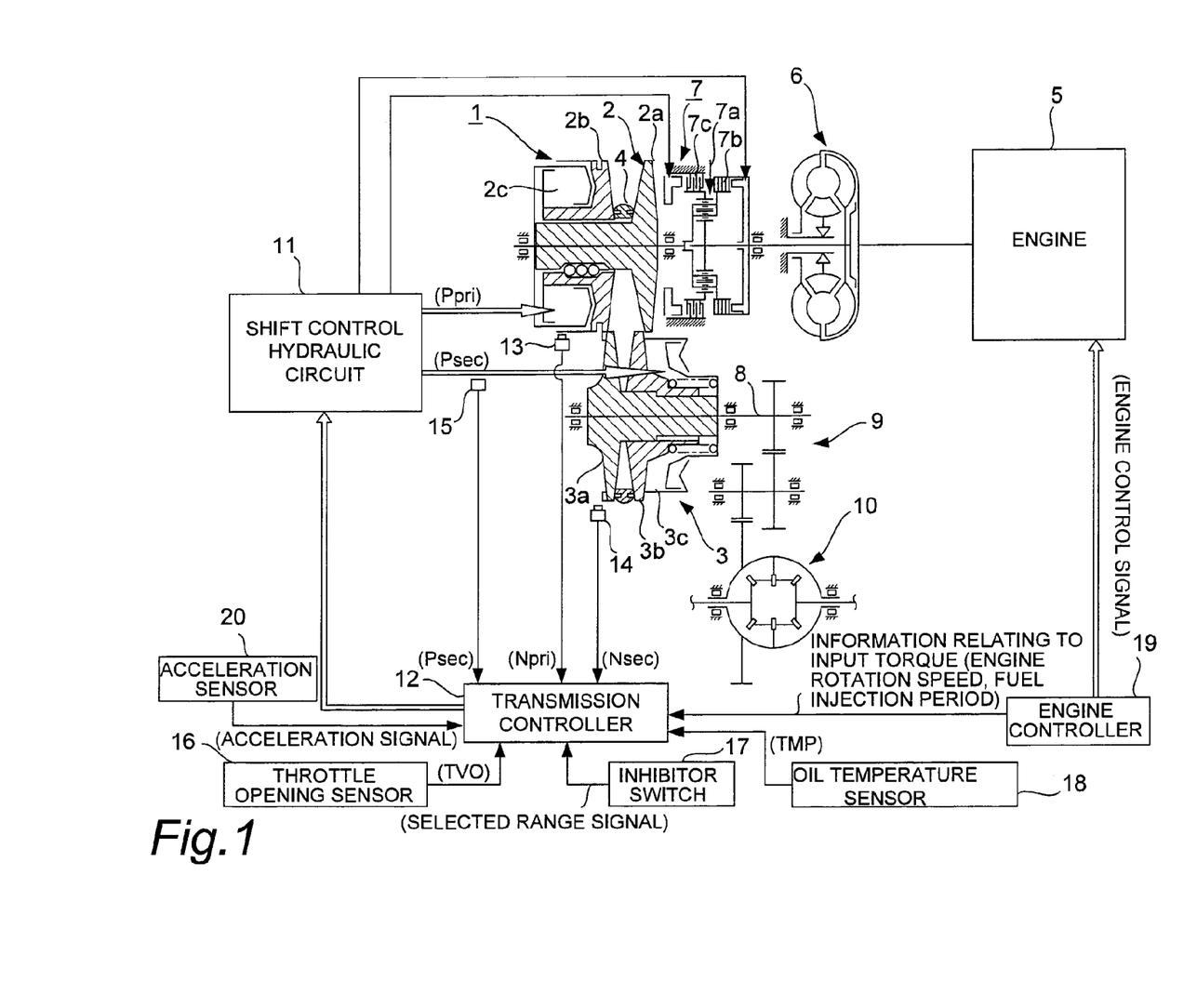
FIG. 1 is a constitutional diagram of a continuously variable transmission according to an embodiment of this invention.

FIG. 1 is a block diagram showing the constitution of a V belt continuously variable transmission 1.

The V belt continuously variable transmission 1 comprises a primary pulley 2 and a secondary pulley 3 disposed such that respective V grooves thereof are aligned, wherein a V belt (belt) 4 is wound around the V grooves of the pulleys 2, 3. An engine 5 is disposed coaxially with the primary pulley 2, and a torque converter 6 having a lockup clutch and a forward-reverse switching mechanism (frictional engagement element) 7 are provided between the engine 5 and the primary pulley 2 in sequence from the engine 5 side.

The forward-reverse switching mechanism 7 has a double pinion planetary gear set 7a as a principle constitutional element, a sun gear of which is coupled to the engine 5 via the torque converter 6 and a carrier of which is coupled to the primary pulley 2. The forward-reverse switching mechanism 7 further includes a forward clutch 7b that directly couples the sun gear and the carrier of the double pinion planetary gear set 7a and a reverse brake 7c that fixes a ring gear. When the forward clutch 7b is engaged, a rotation input from the engine 5 via the torque converter 6 is transmitted as is to the primary pulley 2, and when the reverse brake 7c is engaged, the rotation input from the engine 5 via the torque converter 6 is reversed before being transmitted to the primary pulley 2.

The rotation of the primary pulley 2 is transmitted to the secondary pulley 3 via the V belt 4, whereupon the rotation of the secondary pulley 3 is transmitted to a vehicle wheel via an output shaft 8, a gear set 9, and a differential gear device 10.

To enable modification of a rotation transmission ratio (gear ratio) between the primary pulley 2 and secondary pulley 3 during the power transmission described above, one of two conical plates forming the respective V grooves of the primary pulley 2 and the secondary pulley 3 is set as a fixed conical plate 2a, 3a, and the other conical plate 2b, 3b is set as a movable conical plate (movable flange) capable of displacing in an axial direction. The movable conical plates 2b, 3b are biased toward the fixed conical plates 2a, 3a when a primary pulley pressure (first oil pressure) Ppri and a secondary pulley pressure (second oil pressure) Psec, which are created using a line pressure as a source pressure, are supplied to a primary pulley chamber 2c and a secondary pulley chamber 3c, and as a result, the V belt 4 is caused to engage with the conical plates frictionally such that power is transmitted between the primary pulley 2 and the secondary pulley 3.

During a shift, a V groove width of the two pulleys 2, 3 is varied in accordance with a differential pressure between the primary pulley pressure Ppri and secondary pulley pressure Psec, which are generated to correspond to a target gear ratio Ratio0, whereby a winding arc diameter of the V belt 4 relative to the pulleys 2, 3 is varied continuously, and as a result, an actual gear ratio Ratio is modified such that the target gear ratio Ratio0 is realized.

The primary pulley pressure Ppri and secondary pulley pressure Psec are controlled by a shift control hydraulic circuit 11 as well as an output of an engagement oil pressure of the forward clutch 7b, which is engaged when a forward traveling range is selected, and the reverse brake 7c, which is engaged when a reverse traveling range is selected. The shift control hydraulic circuit 11 executes control in response to a signal from a transmission controller 12.

A signal from a primary pulley rotation speed sensor (primary pulley rotation speed detecting means) 13 that detects a primary pulley rotation speed Npri, a signal from a secondary pulley rotation speed sensor 14 that detects a secondary pulley rotation speed Nsec, a signal from a secondary pulley pressure sensor (secondary pulley pressure detecting means) 15 that detects the secondary pulley pressure Psec, a signal from a throttle opening sensor 16 that detects an opening TVO of a throttle valve, a selected range signal from an inhibitor switch 17, a signal from an oil temperature sensor 18 that detects a shift working oil temperature TMP, a signal (engine rotation speed and fuel injection period) relating to an input torque Ti from an engine controller 19 responsible for controlling the engine 5, and a signal from an acceleration sensor 20 are input into the transmission controller 12.

The primary pulley rotation speed sensor 13 and secondary pulley rotation speed sensor 14 are constituted by Hall elements or the like, for example, which detect a magnetic body provided in a required location on the circumference of the primary pulley 2 and the secondary pulley 3 and output a corresponding pulse signal to the transmission controller 12. The transmission controller 12 then calculates the respective rotation speeds of the primary pulley 2 and secondary pulley 3 by counting a pulse signal count within a predetermined time period from the pulse signals obtained from the primary pulley rotation speed sensor 13 and secondary pulley rotation speed sensor 14.

Figure 2:
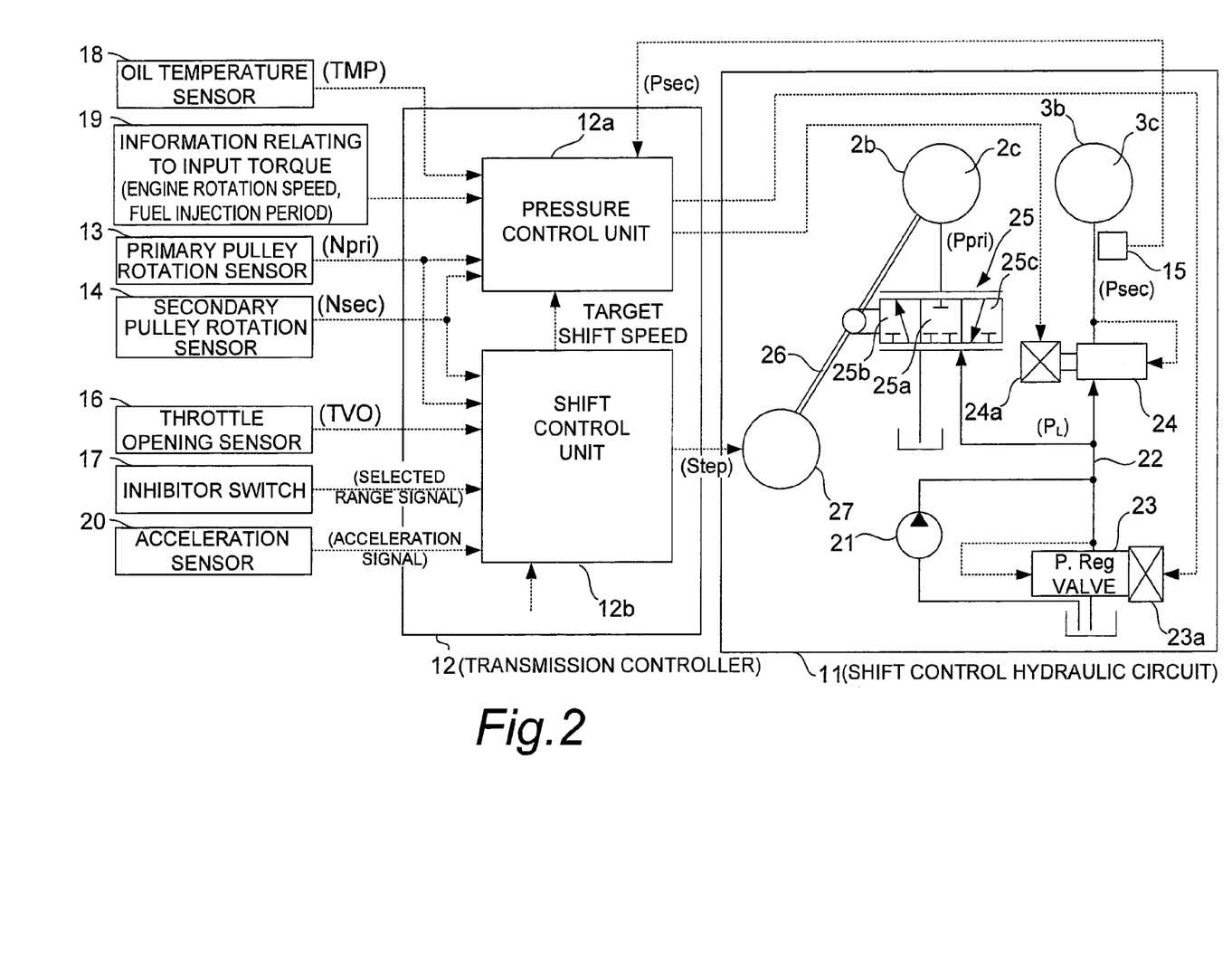
FIG. 2 is a constitutional diagram of a shift control hydraulic circuit and a shift controller according to an embodiment of this invention.

Next, the shift control hydraulic circuit 11 and transmission controller 12 will be described using the constitutional diagram in FIG. 2. First, the shift control hydraulic circuit 11 will be described.

The shift control hydraulic circuit 11 includes an engine-driven oil pump 21, and uses a pressure regulator valve 23 to regulate a pressure of working oil supplied to an oil line 22 by the oil pump 21 to a predetermined line pressure PL. The pressure regulator valve 23 controls the line pressure PL in accordance with a drive duty input into a solenoid 23a.

The line pressure PL of the oil line 22 is on the one hand regulated by a pressure reducing valve 24 and supplied to the secondary pulley chamber 3c as the secondary pulley pressure Psec, and on the other hand regulated by a shift control valve 25 and supplied to the primary pulley chamber 2c as the primary pulley pressure Ppri. The pressure reducing valve 24 constitutes secondary pulley pressure control means which control the secondary pulley pressure Psec in accordance with a drive duty input into a solenoid 24a.

The shift control valve 25 includes a neutral position 25a, a pressure increasing position 25b, and a pressure reducing position 25c, and to switch between these valve positions, the shift control valve 25 is connected to the middle of a shift link 26. The shift link 26 is connected to a step motor 27 serving as a shift actuator at one end, and to the movable conical plate 2b of the primary pulley 2 at the other end.

The step motor 27 is set in an operating position that is advanced from a reference position by a step count Step corresponding to the target gear ratio Ratio0, and when the step motor 27 is operated, the shift link 26 swings using a connecting portion with the movable conical plate 2b as a fulcrum. As a result, the shift control valve 25 is moved from the neutral position 25a to the pressure increasing position 25b or the pressure reducing position 25c. Hence, the primary pulley pressure Ppri is increased using the line pressure PL as a source pressure or decreased through a drain, and thus the differential pressure between the primary pulley pressure Ppri and secondary pulley pressure Psec is varied so as to generate an upshift to a High side gear ratio or a downshift to a Low side gear ratio. Thus, the actual gear ratio Ratio varies in accordance with the target speed ratio Ratio0.

A gear shift progression is fed back to a corresponding end of the shift link 26 via the movable conical plate 2b of the primary pulley 2, whereupon the shift link 26 swings about a connecting portion with the step motor 27 in a direction for returning the shift control valve 25 from the pressure increasing position 25b or the pressure reducing position 25c to the neutral position 25a. Hence, when the target speed ratio Ratio0 is achieved, the shift control valve 25 is returned to the neutral position 25a so that the actual gear ratio Ratio can be held at the target gear ratio Ratio0.

The solenoid drive duty of the pressure regulator valve 23, the solenoid drive duty of the pressure reducing valve 24, and a shift command (the step count) input into the step motor 27 are issued by the transmission controller 12. The transmission controller 12 also performs control to determine whether or not to supply an engagement oil pressure to the forward clutch 7b and the reverse brake 7c shown in FIG. 1. The transmission controller 12 is constituted a pressure control unit 12a and a shift control unit 12b.

The pressure control unit 12a determines the solenoid drive duty of the pressure regulator valve 23 and the solenoid drive duty of the pressure reducing valve 24. The shift control unit 12b calculates an attained gear ratio DsrRTO and the target gear ratio Ratio0.

When a vehicle installed with the V belt continuously variable transmission 1 having the above constitution decelerates, a downshift is executed to improve a post-deceleration restarting ability, whereby the gear ratio is shifted to the Low side. At this time, the transmission controller 12 lowers the primary pulley pressure Ppri using the primary pulley 2 as a drain side (the pressure reducing position 25c). The secondary pulley 3 is controlled by the pressure reducing valve 24, whereby the secondary pulley pressure Psec is raised such that a downshift is performed. Thus, the downshift is completed.

When the vehicle decelerates rapidly in this case, the downshift is also performed rapidly in accordance with the rapid deceleration, and therefore, a gear ratio variation speed must be controlled to prevent belt slippage from occurring.

When the vehicle ultimately comes to a halt in this situation, it may not always be possible to shift the gear ratio to an appropriate gear ratio (a Lowest position, for example) before the vehicle stops. In particular, when rapid deceleration occurs while traveling on an uphill road, the vehicle is more likely to come to a halt due to hill-climbing resistance, and therefore the vehicle stops before the downshift has been performed sufficiently. In this case, restarting is likely to be difficult.

Hence, when the vehicle stops before the gear ratio enters a Low state, control must be performed to shift the gear ratio to Low while the vehicle is stationary in preparation for restarting.

As a method of performing a downshift by controlling the gear ratio while the vehicle is stationary, the gear ratio may be modified by increasing the secondary pulley pressure Psec and reducing the primary pulley pressure Ppri while the pulleys are non-rotational, for example. With this control, a belt gripping force relative to the primary pulley 2 decreases when the primary pulley pressure Ppri is reduced. If the engine torque varies rapidly at this time, the belt may slip due to the reduction in the belt gripping force.

In another example method, a clutch mechanism may be provided between the engine and the primary pulley 2 such that downshift control is performed by increasing the secondary pulley pressure Psec and reducing the primary pulley pressure Ppri while the clutch mechanism is disengaged. However, with this control, shock is generated during disengagement and engagement of the clutch mechanism, and on an uphill road, the vehicle rolls back. Hence, drivability is adversely affected. Moreover, provision of the clutch mechanism leads to increases in cost and weight.

Hence, in this embodiment of the invention, slippage in the belt 4 is prevented by controlling the gear ratio in the following manner when the vehicle is stationary.

Figure 3:
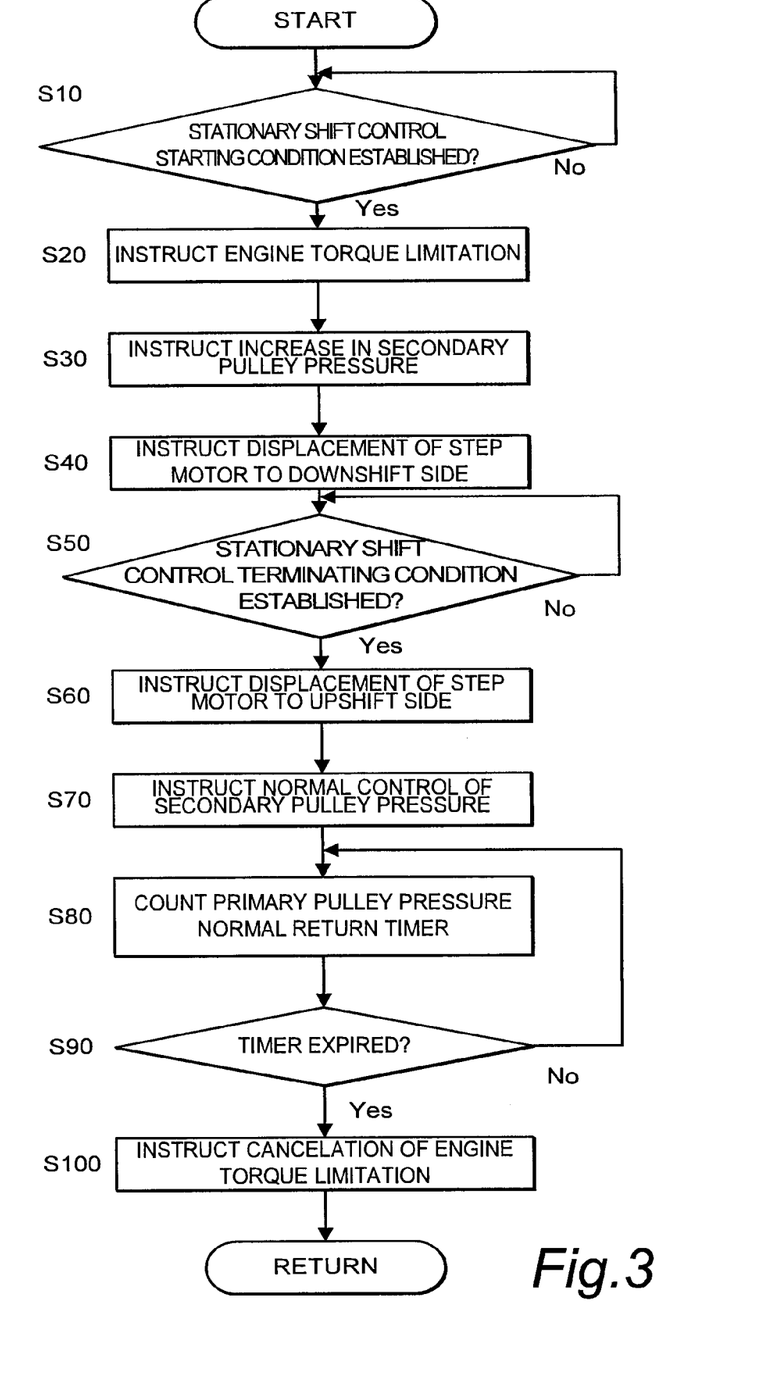
FIG. 3 is a flowchart showing stationary Low return control according to an embodiment of this invention.

FIG. 3 is a flowchart showing stationary Low return control according to this embodiment of the invention.

The control shown in the flowchart of FIG. 3 is executed by the transmission controller 12 at predetermined intervals (of 10 ms, for example).

First, the transmission controller 12 determines whether or not a condition for starting the stationary Low return control is satisfied using the information obtained from the respective sensors described above (S10).

When the stationary Low return control starting condition is satisfied, the routine advances to a step S20. When the condition is not satisfied, the processing of the step S10 is repeated, whereupon a standby state is entered.

The stationary Low return control starting condition is satisfied when the vehicle is stationary and the actual gear ratio is on the High side of a predetermined gear ratio. In other words, the processing of the flowchart to be described below is executed when the vehicle is stationary but a downshift has not been performed sufficiently.

The vehicle is determined to be stationary when a pulse signal count per unit time obtained from the secondary pulley rotation speed sensor 14 is zero. In other words, the secondary pulley rotation speed sensor 14 constitutes vehicle speed detecting means. Further, the actual gear ratio is calculated from the primary pulley rotation speed Npri and the secondary pulley rotation speed Nsec immediately before the vehicle stops.

Having determined that the stationary Low return control starting condition is satisfied, the transmission controller 12 issues a command to the engine controller 19 to limit the torque of the engine 5 in the step S20. In accordance with this command, the engine controller 19 prevents the torque of the engine 5 from increasing regardless of an acceleration intention of a driver, which is indicated by pressing an accelerator pedal or the like.

Next, the transmission controller 12 increases the secondary pulley pressure Psec to a pressure required to perform a downshift and reduces the primary pulley pressure Ppri by controlling the displacement of the step motor 27 to a downshift side such that the shift control valve 25 is set in the pressure reducing position 25c (S30 and S40). As a result, the primary pulley 2 and secondary pulley 3 are stopped and the winding arc diameter of the belt 4 relative thereto is controlled such that a downshift is performed.

At this time, the transmission controller 12 sets the command issued to the step motor 27 at a smaller gear ratio than a maximum gear ratio (Lowest position) by a predetermined amount (on the High side by a predetermined amount). Thus, the primary pulley pressure Ppri is prevented from decreasing more than necessary.

The control performed in the steps S30 and S40 to prevent the primary pulley pressure Ppri from falling will be described in detail below with reference to FIGS. 4 and 5.

Next, the transmission controller 12 determines whether or not a stationary Low return control terminating condition is satisfied (S50).

When the stationary Low return control terminating condition is satisfied, the routine advances to a step S60. When the condition is not satisfied, the processing of the step S50 is repeated, whereupon a standby state is entered.

The stationary Low return control terminating condition is satisfied when a predetermined Low side gear ratio has been attained, when the pulse signal count obtained from the primary pulley rotation speed sensor 13 exceeds a predetermined count, or when an acceleration request is issued by the driver.

A case in which the pulse signal count obtained from the primary pulley rotation speed sensor 13 exceeds the predetermined count corresponds to a case in which a rotation position of the primary pulley 2 in a circumferential direction increases even though the vehicle is stationary and the secondary pulley 3 is stopped. Further, the predetermined count of the pulse signal count is a threshold at which damage and seizure in the belt 4 and the primary pulley 2 caused when the circumferential direction rotation position of the primary pulley 2 exceeds a predetermined amount do not occur.

When the vehicle is stationary, the engine 5 is idle and a creep torque in a converter region of the torque converter 6 is transmitted to the primary pulley 2. Further, the torque of the engine 5 is varied by increases in the load of accessories such as air conditioners and the like, and as a result, the creep torque may increase. Therefore, when the gripping force of the belt 4 generated by the primary pulley pressure Ppri is smaller than the creep torque, the primary pulley 2 rotates. At this time, the secondary pulley 3 is non-rotational, and therefore the rotation of the primary pulley 2 is equivalent to slippage in the belt 4.

Hence, to prevent damage to the belt 4 and the primary pulley 2, the gripping force of the belt 4 must be increased rapidly when the circumferential direction rotation position of the primary pulley exceeds the predetermined amount.

Further, the gear ratio is calculated from the position of the step motor 27 and the secondary pulley pressure Psec, and the acceleration request is obtained from the throttle opening sensor 16.

When the stationary Low return control terminating condition is determined to be satisfied, the transmission controller 12 issues a command to the step motor 27 in the step S60 to cause the step motor 27 to displace from the downshift side displacement commanded in the step S40 to an upshift side displacement that is further toward the upshift side than the aforementioned predetermined gear ratio by a predetermined amount. Thus, the shift control valve 25 is set in the pressure increasing position 25b and the primary pulley pressure Ppri is increased in preparation for a torque increase in the engine 5 corresponding to the acceleration request from the driver. Furthermore, control is performed on the basis of the gear ratio to return the secondary pulley pressure Psec to a normal oil pressure (S70).

Through the control of the steps S60 and S70, the transmission controller 12 modifies the control from the downshift state generated by the stationary Low return control to a normal stationary state in which the gear ratio is maintained.

Next, the transmission controller 12 starts to count a primary pulley pressure Ppri normal return timer (S80) and determines whether or not the normal return timer has expired (S90).

When the primary pulley pressure Ppri normal return timer has expired, the routine advances to a step S100. When the timer has not expired, the processing of the step S90 is repeated, whereupon a standby state is entered.

The primary pulley pressure Ppri normal return timer is set as hysteresis for ensuring that the primary pulley pressure Ppri is sufficiently stable following the return to normal control in the steps S60 and S70.

When the primary pulley pressure Ppri normal return timer expires, the transmission controller 12 issues a command to the engine controller 19 in the step S100 to cancel the torque limitation applied to the engine 5. As a result of this command, the engine 5 is controlled on the basis of the acceleration intention of the driver indicated by pressing the accelerator pedal or the like, and thus the vehicle becomes capable of travel.

By performing the control described above, the transmission controller 12 constitutes stationary Low return control means for performing a downshift while the vehicle is stationary to return the gear ratio to the Low side when the vehicle stops at a High side gear ratio.

Next, the processing of the steps S30 and S40 of the stationary Low return control shown in FIG. 3 will be described with reference to FIGS. 4 and 5.

As described above, during the stationary Low return control, the transmission controller 12 performs a downshift by increasing the secondary pulley pressure Psec and reducing the primary pulley pressure Ppri.

In this embodiment of the invention, the following control is executed to prevent the gripping force of the belt 4 from falling more than necessary due to the decrease in the primary pulley pressure Ppri. Specifically, the transmission controller 12 controls the displacement of the step motor 27 such that the shift control valve 25 is set slightly toward the neutral position 25a side rather than the maximum position of the pressure reducing position 25c, thereby reducing the opening of the shift control valve 25 for draining the primary pulley pressure Ppri.

Figure 4:
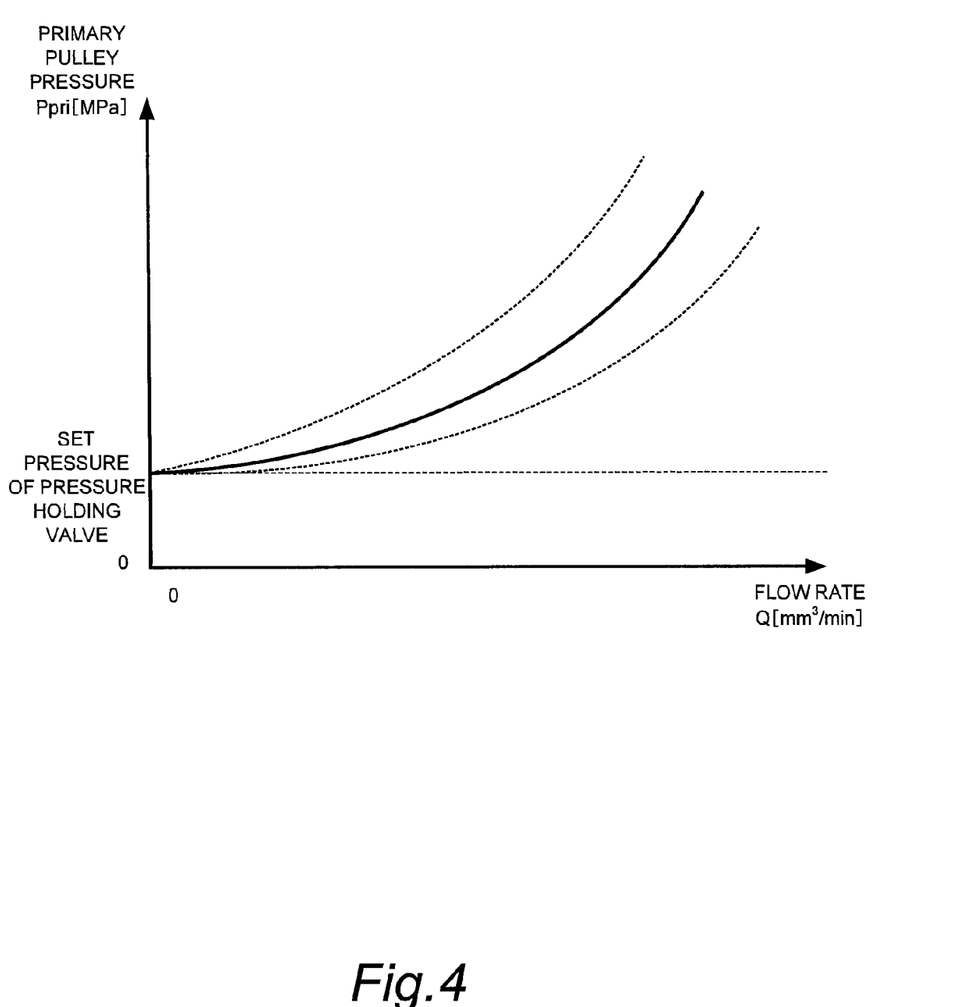
FIG. 4 is an illustrative view showing a relationship between an oil pressure and an opening of a shift control valve according to an embodiment of this invention.

FIG. 4 is an illustrative view showing a relationship between the oil pressure and the opening of the shift control valve 25.

As shown in FIG. 4, on a drain side of the primary pulley pressure Ppri, the primary pulley pressure Ppri increases as a flow rate Q [mm³/min] increases. In other words, the primary pulley pressure Ppri increases as a downshift speed rises. Further, when the opening of the shift control valve 25 is increased, the primary pulley pressure Ppri falls. When the opening of the shift control valve 25 is reduced, on the other hand, the opening forms an orifice, leading to an increase in a viscosity resistance of the working oil and an increase in the primary pulley pressure Ppri. It should be noted that the primary pulley pressure Ppri is held at or above a predetermined pressure by a pressure holding valve (not shown) provided in the shift control valve 25.

The transmission controller 12 uses the fact that the primary pulley pressure Ppri increases in accordance with the opening and the downshift speed to prevent the gripping force of the belt 4 from decreasing.

Figure 5:
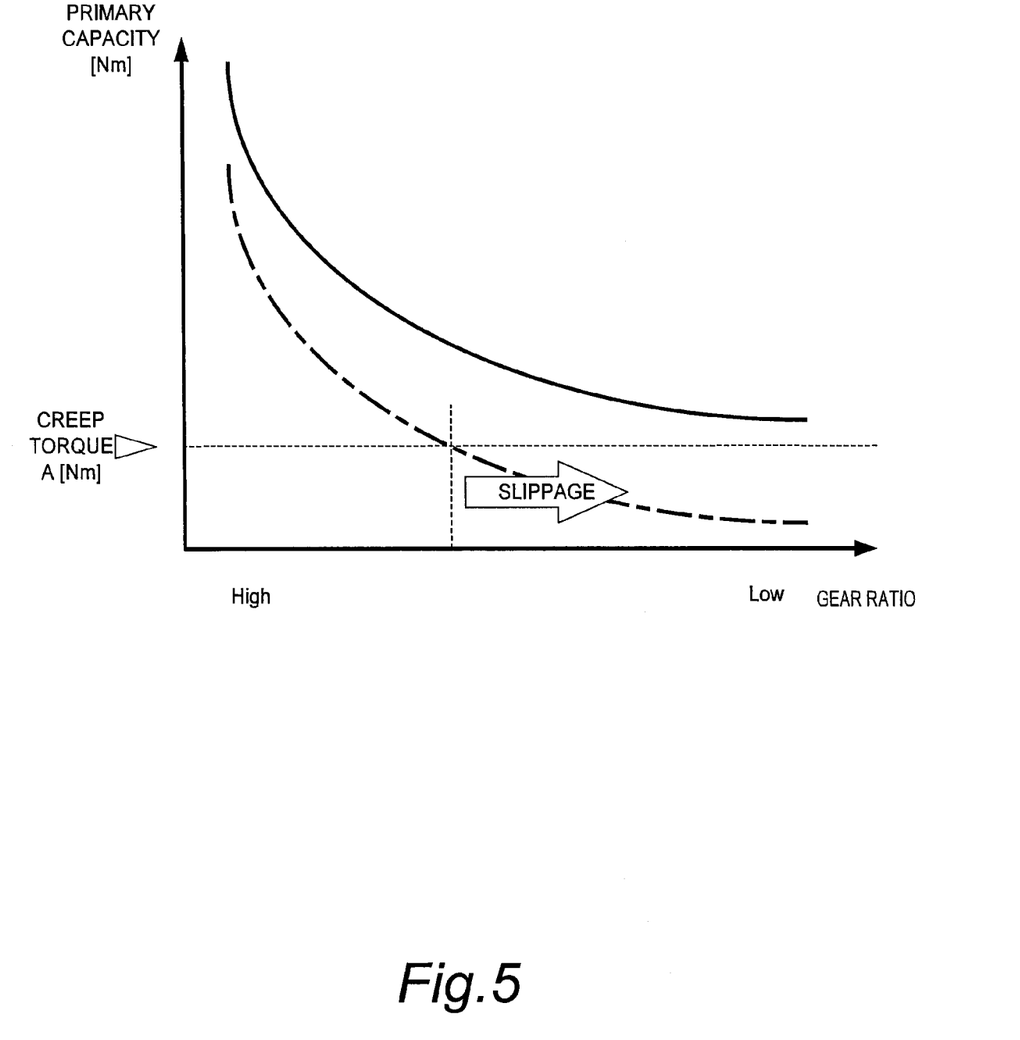
FIG. 5 is an illustrative view showing a result of the stationary Low return control according to an embodiment of this invention.

FIG. 5 is an illustrative view showing a result of the stationary Low return control according to this embodiment of the invention.

FIG. 5 shows a relationship between the gear ratio and a primary capacity during the downshift control.

Typically, the primary capacity decreases as the gear ratio shifts toward the Low side. Here, the primary capacity is the torque that can be transmitted by the primary pulley in accordance with the belt gripping force obtained from the primary pulley pressure Ppri.

In FIG. 5, the engine 5 is assumed to be idle, and a creep torque A [Nm] corresponding to the converter region of the torque converter 6 is input into the primary pulley 2. When the primary capacity falls below the creep torque A [Nm], the belt gripping force becomes insufficient, and as a result, slippage occurs in the belt 4.

A curve indicated by a dot-dash line in FIG. 5 shows a relationship between the actual gear ratio Ratio and the primary capacity when the shift control valve 25 is fully open on the pressure reducing position 25c side of the primary pulley pressure Ppri. In this state, as described above, slippage occurs in the belt 4 on the Low side of the predetermined gear ratio.

Meanwhile, a curve indicated by a solid line in FIG. 5 shows a state in which the primary capacity has increased due to the effects of this embodiment of the invention.

In this embodiment of the invention, as described above with reference to the steps S30 and S40 of FIG. 3, a downshift is performed by increasing the secondary pulley pressure Psec and setting the command issued to the step motor 27 at a smaller gear ratio than the maximum gear ratio (Lowest position) by a predetermined amount (i.e. on the High side by a predetermined amount).

In this state, the flow rate Q [mm³/min] is generated by the downshift. Further, the opening of the shift control valve 25 is controlled to be smaller than the maximum position of the pressure reducing position 25c of the primary pulley pressure Ppri by a predetermined amount. Moreover, the opening of the shift control valve 25 is reduced as the gear ratio is shifted toward the Low side. Hence, through the actions of FIG. 4, the primary pulley pressure Ppri increases such that a sufficient primary capacity can be secured over an entire region extending from the start of the stationary Low return control to the completion of the control and the return to a normal state, and as a result, slippage in the belt 4 can be suppressed.

The degree to which the opening of the shift control valve 25 is controlled and the degree to which the primary pulley pressure Ppri is increased may be determined appropriately in accordance with the output of the engine 5, the weight of the vehicle in which the V belt continuously variable transmission 1 is installed, and so on. For example, the opening of the shift control valve 25 during the stationary Low return control may be set on the basis of the creep torque of the engine 5 and an idle up range of the accessories and so on such that a primary capacity which exceeds the torque can be secured.

Figure 6:
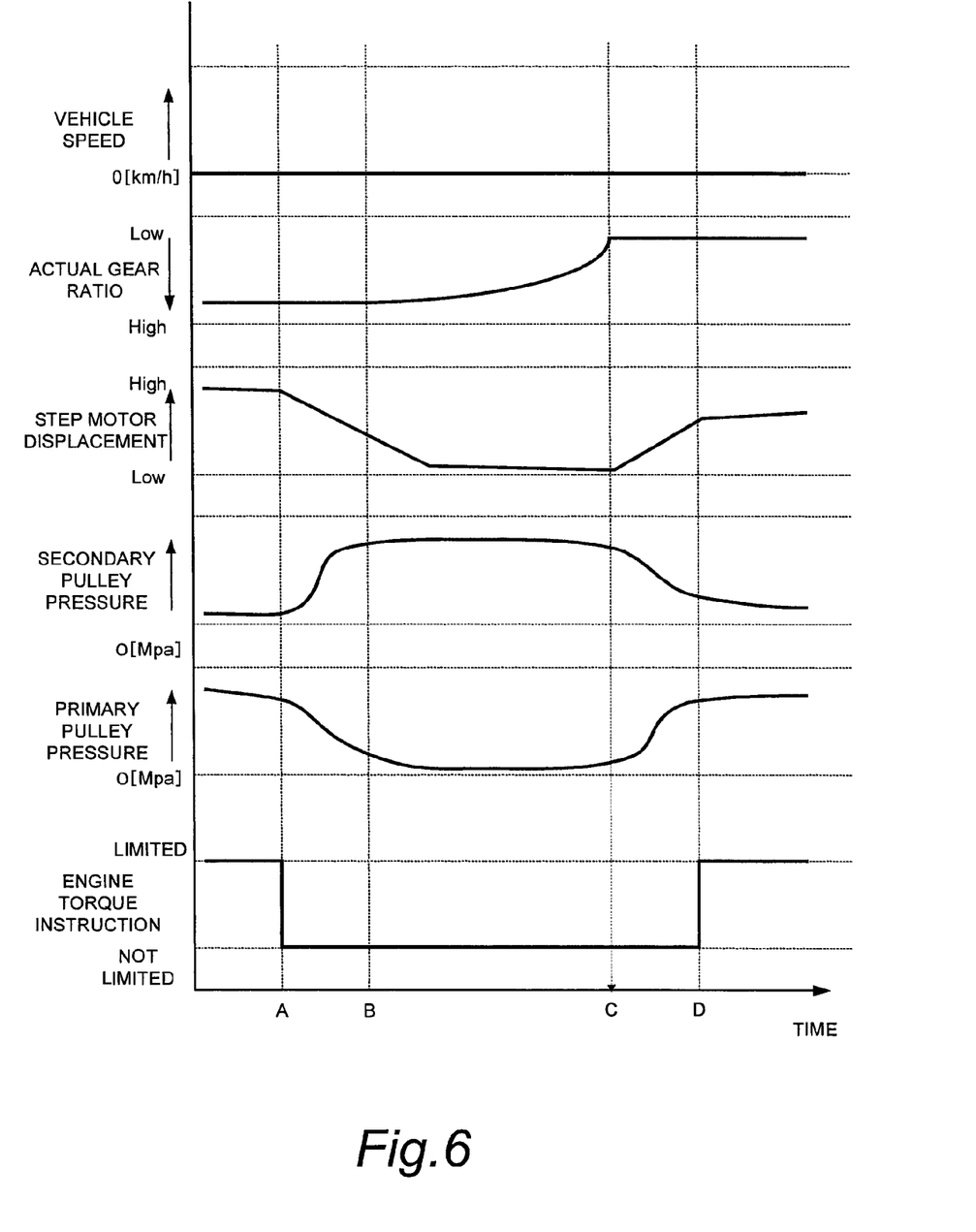
FIG. 6 is a time chart of the stationary Low return control according to an embodiment of this invention.

FIG. 6 is a time chart of the stationary Low return control according to this embodiment of the invention.

When the vehicle is stationary, or in other words the vehicle speed is 0 [km/h] and the gear ratio is determined to be on the High side of the predetermined gear ratio (the step S10 of FIG. 3), the transmission controller 12 executes the stationary Low return control (a timing A).

First, the transmission controller 12 issues a command to the engine controller 19 to limit the torque of the engine 5 so that the torque does not increase (the step S20 of FIG. 3).

As a result, torque generation in the engine 5 is limited.

Next, the transmission controller 12 executes control to increase the secondary pulley pressure Psec and controls the gear ratio to a downshift by setting the displacement of the step motor 27 on the downshift side and controlling the primary pulley pressure Ppri to the drain (the steps S30 and S40 of FIG. 3).

As a result, the secondary pulley pressure Psec increases gradually and the primary pulley pressure Ppri decreases gradually. The displacement of the step motor 27 is controlled such that a gear ratio which is further toward the High side than the maximum gear ratio (Lowest position) by a predetermined amount is attained.

As a result of this control, the gear ratio is gradually downshifted to the Low side (a timing B).

When the gear ratio is detected to have reached the predetermined gear ratio thereafter or the like such that the stationary Low return control terminating condition is satisfied (Yes in the step S50 of FIG. 3), the transmission controller 12 executes control to terminate the stationary Low return control (a timing C). More specifically, the step motor 27 is displaced from the downshift side to the upshift side (the step S50 of FIG. 3) and a slight upshift is performed by stopping the secondary pulley pressure Psec from increasing (the step S60 of FIG. 3).

The transmission controller 12 then waits for the primary pulley pressure normal return timer to expire (a timing D, Yes in the step S90 of FIG. 3), and then issues a command to cancel the torque limitation applied to the engine 5 (the step S100 of FIG. 3).

In this embodiment of the invention, the displacement of the step motor 27 is controlled to a smaller gear ratio than the maximum gear ratio (Lowest position) by a predetermined amount (to the High side by a predetermined amount) during the stationary Low return control, which is executed to control the gear ratio from the High side to the Low side when the vehicle is stationary. As a result, a reduction in the belt gripping force caused by the reduction in the primary pulley pressure Ppri and belt slippage caused by variation in the torque of the engine 5 when the vehicle is stationary can be prevented.

In this embodiment of the invention in particular, no physical modifications are applied to the driving system of a typical vehicle constituted by the engine 5, the torque converter 6, and the V belt continuously variable transmission 1, and therefore cost and weight increases are not incurred. Moreover, deterioration of the drivability due to the addition of a clutch mechanism, for example, does not occur.

Further, when the circumferential direction rotation position of the primary pulley 2 exceeds a predetermined amount during the stationary Low return control, normal control is resumed rapidly. Hence, when belt slippage occurs even though the stationary Low return control has been executed, damage and seizure in the primary pulley 2 and the belt 4 can be prevented.

This invention is not limited to the embodiment described above, and naturally includes various modifications and improvements within the scope of the technical spirit thereof.

This application claims priority from Japanese Patent Application P2008-142735 filed May. 30, 2008, which is incorporated herein by reference.

What is claimed is:

1. A control device for a belt type continuously variable transmission including an input side primary pulley, a groove width of which is varied in accordance with a first oil pressure, an output side secondary pulley, a groove width of which is varied in accordance with a second oil pressure, and a belt wound around the primary pulley and the secondary pulley such that a contact radius thereof with the primary pulley and the secondary pulley varies in accordance with the groove width, which controls the continuously variable transmission such that a torque transmitted from an output side of an engine of a vehicle is transmitted from the primary pulley to the secondary pulley via the belt and a gear ratio determined in relation to the contact radius varies continuously, the control device comprising:
    a vehicle speed detecting unit that detects a vehicle speed;
    a shift actuator;
    a shift control valve that controls the first oil pressure by being switched between a position in which the first oil pressure is supplied to the primary pulley, a position in which the first oil pressure is discharged, and a neutral position in accordance with a physical positional relationship between a position of a movable flange of the primary pulley and a position of the shift actuator;
    a secondary pulley pressure control unit that controls the second oil pressure; and
    a stationary Low return control unit that varies the gear ratio to a Low side when the vehicle is stationary by controlling the shift control valve in accordance with the position of the shift actuator such that the first oil pressure is discharged and controlling the secondary pulley pressure control unit to increase the second oil pressure to a predetermined oil pressure, whereby the contact radius between the belt and the primary pulley is displaced in a decreasing direction and the contact radius between the belt and the secondary pulley is displaced in an increasing direction while the primary pulley and the secondary pulley are non-rotational,
    wherein the stationary Low return control unit controls the position of the shift actuator such that the shift control valve is controlled to a position in which the first oil pressure shifts toward the neutral position by a predetermined amount from a maximum discharge side position during a state wherein torque is transmitting to the primary pulley from the engine.

2. The control device defined in claim 1, further comprising a primary pulley rotation speed detecting unit that detects a rotation speed of the primary pulley by detecting a rotation angle of the primary pulley,
    wherein, when the rotation angle of the primary pulley exceeds a predetermined amount while the vehicle is stationary, the stationary Low return control unit controls the position of the shift actuator such that the shift control valve is controlled to the position in which the first oil pressure is supplied.

3. A control method for a belt type continuously variable transmission comprising an input-side primary pulley, a groove width of which is varied in accordance with a first oil pressure, an output-side secondary pulley, a groove width of which is varied in accordance with a second oil pressure, and a belt wound around the primary pulley and the secondary pulley such that a contact radius thereof with the primary pulley and the secondary pulley varies in accordance with the groove width, which controls the continuously variable transmission such that a torque transmitted from an output-side of an engine of a vehicle is transmitted from the primary pulley to the secondary pulley via the belt and a gear ratio determined in relation to the contact radius varies continuously, a shift actuator and a shift control valve which controls the first oil pressure by being switched between a position in which the first oil pressure is supplied to the primary pulley, a position in which the first oil pressure is discharged, and a neutral position in accordance with a physical positional relationship between a position of a movable flange of the primary pulley and a position of the shift actuator, the control method comprising:
    a vehicle speed detecting step for detecting a vehicle speed;
    a secondary pulley pressure control step for the second oil pressure; and
    a stationary Low return control step for varying the gear ratio to a Low side when the vehicle is stationary by controlling the shift control valve in accordance with the position of the shift actuator such that the first oil pressure is discharged and executing the secondary pulley pressure control step to increase the second oil pressure to a predetermined oil pressure, whereby the contact radius between the belt and the primary pulley is displaced in a decreasing direction and the contact radius between the belt and the secondary pulley is displaced in an increasing direction while the primary pulley and the secondary pulley are non-rotational,
    wherein the stationary Low return control step controls the position of the shift actuator such that the shift control valve is controlled to a position in which the first oil pressure shifts toward the neutral position by a predetermined amount from a maximum discharge side position during a state wherein torque is transmitting to the primary pulley from the engine.

4. The control method defined in claim 3, further comprising a primary pulley rotation speed detecting step for detecting a rotation speed of the primary pulley by detecting a rotation angle of the primary pulley,
    wherein, when the rotation angle of the primary pulley exceeds a predetermined amount while the vehicle is stationary, the stationary Low return control step controls the position of the shift actuator such that the shift control valve is controlled to the position in which the first oil pressure is supplied.

5. A control device for a belt type continuously variable transmission including an input-side primary pulley, a groove width of which is varied in accordance with a first oil pressure, an output-side secondary pulley, a groove width of which is varied in accordance with a second oil pressure, and a belt wound around the primary pulley and the secondary pulley such that a contact radius thereof with the primary pulley and the secondary pulley varies in accordance with the groove width, which controls the continuously variable transmission such that a torque transmitted from an output-side of an engine of a vehicle is transmitted from the primary pulley to the secondary pulley via the belt and a gear ratio determined in relation to the contact radius varies continuously, the control device comprising:
    vehicle speed detecting means for detecting a vehicle speed;
    a shift actuator;

a shift control valve which controls the first oil pressure by being switched between a position in which the first oil pressure is supplied to the primary pulley, a position in which the first oil pressure is discharged, and a neutral position in accordance with a physical positional relationship between a position of a movable flange of the primary pulley and a position of the shift actuator;

secondary pulley pressure control means for controlling the second oil pressure; and stationary Low return control means for varying the gear ratio to a Low side when the vehicle is stationary by controlling the shift control valve in accordance with the position of the shift actuator such that the first oil pressure is discharged and controlling the secondary pulley pressure control means to increase the second oil pressure to a predetermined oil pressure, whereby the contact radius between the belt and the primary pulley is displaced in a decreasing direction and the contact radius between the belt and the secondary pulley is displaced in an increasing direction while the primary pulley and the secondary pulley are non-rotational, wherein the stationary Low return control means controls the position of the shift actuator such that the shift control valve is controlled to a position in which the first oil pressure shifts toward the neutral position by a predetermined amount from a maximum discharge side position during a state wherein torque is transmitting to the primary pulley from the engine.

6. The control device for a belt type continuously variable transmission as defined in claim 5, further comprising a primary pulley rotation speed detecting means for detecting a rotation speed of the primary pulley by detecting a rotation angle of the primary pulley, wherein, when the rotation angle of the primary pulley exceeds a predetermined amount while the vehicle is stationary, the stationary Low return control means controls the position of the shift actuator such that the shift control valve is controlled to the position in which the first oil pressure is supplied.

* * * * *